United States Patent
Taricani, Jr.

(10) Patent No.: US 6,347,304 B1
(45) Date of Patent: *Feb. 12, 2002

(54) COMPUTER-BASED SYSTEM, COMPUTER PROGRAM PRODUCT AND METHOD FOR RECOVERING TAX REVENUE

(75) Inventor: Joseph F. Taricani, Jr., Corona Del Mar, CA (US)

(73) Assignee: Interstate Solutions, LLC, Corona Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,900

(22) Filed: Oct. 14, 1999

Related U.S. Application Data

(63) Continuation of application No. 09/078,616, filed on May 14, 1998, now Pat. No. 6,016,479.
(60) Provisional application No. 60/074,357, filed on Feb. 10, 1998, provisional application No. 60/076,502, filed on Mar. 2, 1998, and provisional application No. 60/082,554, filed on Apr. 21, 1998.

(51) Int. Cl.[7] .............................................. G06F 17/60
(52) U.S. Cl. ............................. 705/19; 705/16; 705/17; 705/26; 705/31
(58) Field of Search .............................. 705/16, 17, 19, 705/26, 31

(56) References Cited

U.S. PATENT DOCUMENTS

| | | | |
|---|---|---|---|
| 5,644,724 A | * 7/1997 | Cretzler | 705/19 |
| 5,875,433 A | 2/1999 | Francisco et al. | |
| 6,016,479 A | * 1/2000 | Taricani, Jr. | 705/19 |

FOREIGN PATENT DOCUMENTS

| WO | WO-96/36948 | * 11/1996 |
|---|---|---|

OTHER PUBLICATIONS

Dialog file 275 No. 01385988, Buying Smart: everything you need to know to pick up the phone and buy with confidence. PC sources, V1 n10, Oct. 1990.*

* cited by examiner

*Primary Examiner*—Eric W. Stamber
*Assistant Examiner*—Raquel Alvarez
(74) *Attorney, Agent, or Firm*—Oblon, Spivak, McClelland, Maier & Neustadt, P.C.

(57) ABSTRACT

An effective and efficient system for recovering tax revenue. One implementation is to recover tax revenue currently not being recovered by storing data in a database indicating interstate sales transactions on which a seller does not collect a designated tax, such as a sales tax. This database is part of a computer network which organizes and stores the data in the database and automatically sends out tax due notices to purchasers when data in the database indicates that an interstate sale has taken place and no designated tax has been collected from the purchaser by the seller. This database can also be updated to reflect payment of the tax indicated in the tax due notice, and can automatically remit appropriate revenues to a revenue agency when the tax due notice has been paid. One implementation is also collecting a simplified tax on all interstate sales transactions, and then storing data in a database indicating this collected simplified tax and data as to a revenue agency entitled to the tax based on the purchaser, the state of residence of the purchaser, etc. Based on this data in the database, the collected simplified taxes can be proportioned and routed to the appropriate revenue agency.

25 Claims, 12 Drawing Sheets

FIGURE 4

| PURCHASER NAME | ADDRESS1 | ADDRESS2 | SALE DATE | SALE AMOUNT | CATEGORY | REVENUE AGENCY CODE |
|---|---|---|---|---|---|---|
| -------- | -------- | -------- | -------- | -------- | -------- | -------- |
| -------- | -------- | -------- | -------- | -------- | -------- | -------- |
| -------- | -------- | -------- | -------- | -------- | -------- | -------- |
| -------- | -------- | -------- | -------- | -------- | -------- | -------- |
| -------- | -------- | -------- | -------- | -------- | -------- | -------- |
| -------- | -------- | -------- | -------- | -------- | -------- | -------- |
| -------- | -------- | -------- | -------- | -------- | -------- | -------- |

COMPUTER-BASED SYSTEM, COMPUTER PROGRAM PRODUCT AND METHOD FOR RECOVERING TAX REVENUE

CROSS-REFERENCE TO RELATED APPLICATIONS

The present application claims priority on and contains subject matter related to that disclosed in commonly owned, continuation application Ser. No. 09/078,616 filed on May 14, 1998, now U.S. Pat. No. 6,016,479 provisional applications No. 60/074,357 filed on Feb. 10, 1998, No. 60/076,502 filed on Mar. 2, 1998, and No. 60/082,554 filed on Apr. 21, 1998, the contents of each of which are incorporated herein by reference.

BACKGROUND OF THE INVENTION

1. Field of the Invention

The present invention is directed to methods, computer-based systems and computer program products that recover tax revenue, and that in one particular operation assists in the recovery of taxes due on interstate sales, including mail-order and Internet sales, on which no tax was collected at the time of sale or subsequently remitted by a purchaser, and that in one further particular operation collects a simplified tax and appropriately routes the collected revenue to the appropriate governmental agency.

2. Discussion of the Background

At the present time the vast majority of sales that take place by mail-order or over the Internet (or other "virtual" sales forums) are not taxed by either the state in which the selling company is located or the state in which the purchaser is located. For example, if a buyer in Maryland purchases a product over the Internet or through mail-order from a company in California, the seller does not collect sales tax on that sales transaction since the sale did not technically take place in California, and the buyer was not physically located in California at the time of sale. Maryland does not receive a tax on that sales transaction because, undoubtedly, Maryland revenue officials would not have been made aware of the sale. While the buyer, a Maryland resident, has an obligation to pay a Use tax, few individuals voluntarily pay the tax (or are even aware of their obligation to pay the tax).

At the present time state revenue agencies are limited in their ability to) require out-of-state businesses with no physical presence in their state, e.g., mail-order or Internet sellers, to collect sales taxes that are due from purchases made by residents in their state. The determining factor as to whether a state can require a seller to collect its sale taxes is a detected "nexus", physical presence (or lack thereof), on the part of the seller, which determines collection responsibility. In the example noted above, the state of Maryland cannot compel the seller in California to collect Maryland sales tax from the purchaser in Maryland because the seller in California does not have any physical presence in, i.e. "nexus" with, the state of Maryland. Thus, unlike intrastate sales, where the state may place the tax collection burden on the seller, the state does not have the legal power to place the tax collection burden on out-of-state sellers. Furthermore, due to the lack of information regarding the sale, and the lack of a communications infrastructure to send tax due notices and monitor the remittance of funds, states routinely experience significant lost opportunities to collect taxes on interstate sales made via these mediums.

Moreover, if a business does not maintain any physical presence in a particular state, but sells merchandise to a resident of that state, the business is not burdened with collecting sales tax at the time the sale is made. However, most states that have sales taxes also place an obligation on the purchaser of that state to pay the required tax (as determined by state sales tax provisions) whether the tax is collected by the seller or not (i.e., the burden is placed on the buyer to voluntarily pay the tax). Certain states also have a "Use" tax which can be levied on such sales in lieu of a sales tax, but which is generally at the same rate as the state sales tax. The reality is, however, that such purchasers of mail-order and Internet sales will rarely voluntarily pay the required sales or use tax. Further, state revenue agencies are severely disadvantaged if the seller does not collect the required tax because the state revenue agency rarely finds out that a sale was made, and thus is unaware of the taxable sale. Since revenue agencies are not aware of such sales transactions, and as consumers rarely voluntarily pay the required applicable sales or use tax, a large amount of revenue is currently uncollected.

This problem of allowing such taxable transactions to go unrecorded and thereby be untaxed is accelerating rapidly as Internet sales increase. It has been estimated that lost revenue for state revenue agencies will be measured in tens of billions of dollars by the year 2002. Moreover, in-state taxpaying businesses have complained of a disadvantage to their respective firms in being required to charge sales tax, while mail-order and Internet sales do not impose and collect a sales tax.

In one effort to contend with this lost revenue opportunity, enforce taxpayer responsibility, and to create a level playing field for such in-state taxpaying businesses, some states have joined with other states in arrangements known as "Compacts". Under such "Compacts", Compact members agree to share transaction information retrieved via revenue department audits of in-state mail order and Internet-based firms with other members of the Compact. Such audits frequently reveal sales to residents of other states in the Compact. This information is then provided to the Compact members for purposes of billing their taxpayers for such sales. However, at the present time such Compact arrangements are fragmented and yield modest revenue recovery, and do not create the necessary scale to build an effective billing and collection system.

Also, it has been suggested at different times in Congress, pursuant to its Commerce Clause power to regulate interstate commerce, to require mail-order sellers to keep track of each out-of-state sale and to collect the appropriate sales tax for each out-of-state sale. However, at this time no such requirement has been implemented due to the burdensome nature of requiring a seller to monitor sales taxes which can vary not only between the different states, but also between different jurisdictions within the states. It has been estimated that there are thousands of different taxing jurisdictions (about 6000), each of which has the authority to charge different sales taxes. Shifting such a tax collection burden from the states themselves to the sellers would serve as yet another taxation—a government mandated activity levied on sellers, which presumably would give "big business" an unfair advantage over small "mom and pop" franchises who barely have sufficient resources to conduct their own business, let alone calculate, collect and distribute interstate taxes for which the business gets no monetary gain or economic value. To further complicate matters, these jurisdictions have different tax rates, and also have different provisions for not taxing certain merchandise, e.g., some states do not tax the sale of food or certain clothing. Requiring a seller, particularly small businesses such as those emerging on the Internet, to collect the taxes for each of these different Jurisdictions has been found to be burdensome and thus has not been implemented.

Another problem with conventional tax revenue systems is that there are currently no efficient systems to route collected tax revenues to the appropriate revenue agencies, or to verify that the taxes are being collected. Such problems would only be exacerbated if a seller was required to collect sales taxes for all taxing jurisdictions on out-of-state sales.

One solution to a related, but different, problem is disclosed in U.S. Pat. No. 5,644,724 to Cretzler. This patent describes a system for more efficiently routing in-state sales tax revenues from credit card transactions to an appropriate state revenue collecting agency. However, the system of Cretzler is only applied to credit card transactions and does not even address interstate sales transactions on which no tax is currently collected, and for which no infrastructure is established to identify taxable events, determine if a tax was voluntarily paid on the taxable event, issue a notice if the tax was not paid after a predetermined period of time, and perform periodic checks to determine if the tax was subsequently paid.

SUMMARY OF THE INVENTION

The inventor of the present invention has recognized that currently no effective methods, systems or computer program products are available to assist in collecting sales or use taxes on interstate transactions (including Internet and mail-order) in which the seller does not collect the tax. Accordingly, one object of the present invention is to provide a solution to this problem, as recognized by the present inventor.

The inventor of the present invention has also recognized that currently no efficient methods, systems or computer program products exists to assist in routing collected revenue on sales taxes to appropriate revenue collection agencies. Accordingly, a further object of the present invention is to provide a solution to this problem, as recognized by the inventor.

To achieve these objects, the present inventor has invented a novel computer-based system, method and computer program product, by which interstate sales tax collection is performed in a cost-effective manner, and which fairly applies existing (and contemplated) laws to consumers depending on state guidelines, and does not unfairly shift the government's burden of tax collection to the seller.

In one implementation, the present invention populates a database with data of interstate transactions on which the seller did not collect a designated tax. Such data is then appropriately organized, correlated and reviewed in the database, and tax due notices are automatically sent to purchasers based on such transaction data stored in the database on which no tax was collected.

As a further feature, the novel system, method and computer program product of the present invention verifies whether a tax has been paid on an issued tax due notice, and if so automatically remits the appropriate funds to a revenue agency.

In one further implementation, the present invention sets forth a novel computer-based system, method and computer program product that receives a collected tax from a seller along with information as to the purchase and purchaser, and stores this data in a database. After organizing and correlating the data, the appropriate transfer of the collected revenue to appropriate revenue agencies is effected.

Other features and facets of the present invention, too numerous to mention in this summary section, will become clear in light of the detailed discussion to follow.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIG. 4 shows one example of a data field structure in one embodiment of the present invention;

DESCRIPTION OF THE PREFERRED EMBODIMENTS

Figure 1:
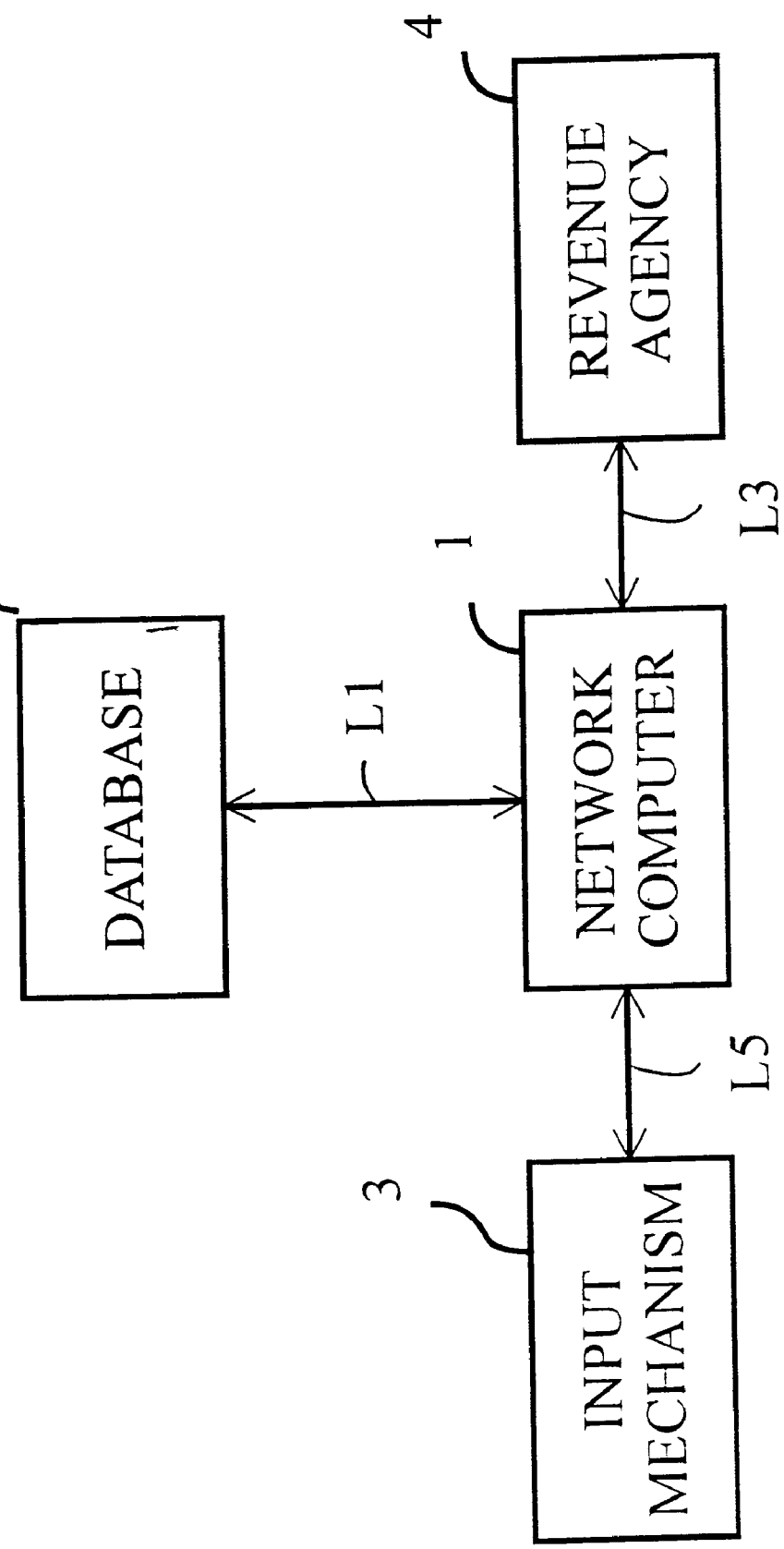
FIG. 1 is a block diagram showing an overall system configuration in one embodiment of the present invention.
Figure 7:
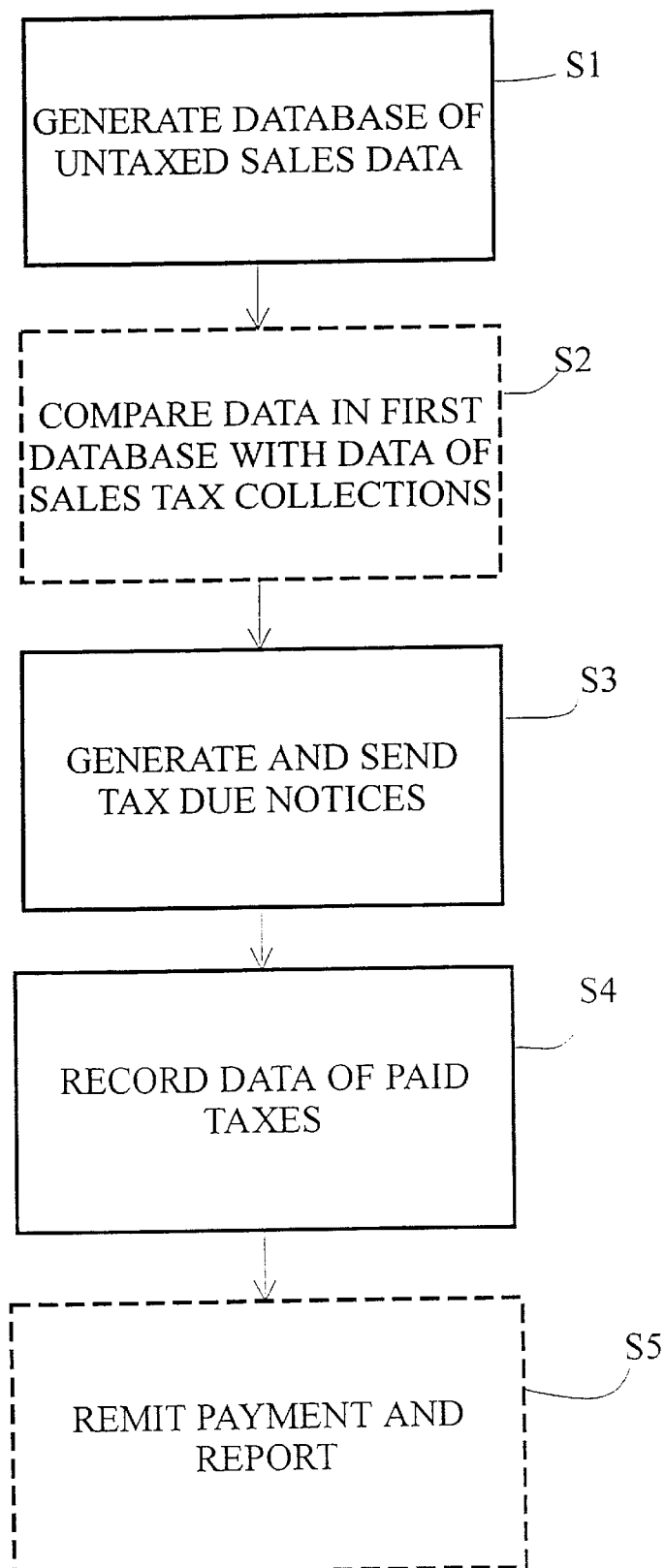
FIG. 7 is a flow diagram of an overall process control system operation in the embodiment of the present invention of FIG. 1.

Referring now to the drawings, wherein like reference numerals designate identical or corresponding parts throughout the several views, and more particularly to FIGS. 1 and 7 thereof, an overall system architecture and system control operation of the present invention is shown.

As shown in FIG. 1, the system of the present invention includes a network computer 1 connected to a database 2, for example by way of a local bus L1. The network computer 1 writes data into the database 2 (i.e., populates the database 2) and retrieves data from the database 2. The network computer 1 is also connected to a revenue agency 4 by way of a data link L3 (e.g. a proprietary land line with T-1 to T-3 bandwidth, although other links may be used as well, such as one or more ISDN links, wireless links, fiber cables, and other links that preferably are digital so as to support data encryption). The link L3 carries exchange information between the network computer 1 and the revenue agency 4; this revenue agency 4 can, as one example only, be a state revenue agency (alternatively a county agency, municipality or any other revenue collection agency). The network computer 1 is also connected to an input mechanism 3, via link L3, which inputs data to the network computer 1, including data which can then be stored in the database 2.

The database 2 is a commercially available database, such as an ORACLE 7 or ORACLE 8 available from ORACLE Corporation. However, proprietary or other commercially available hardware and software databases may be used, such as IBM's DB2 or SQL database running on an IBM SP1, SP2, RISC 6000 or mainframe computer. The network computer 1 is a SPARKSTATION available from SUN MICROSYSTEMS, although other computers may be used as well such as an ULTRA ENTERPRISE 10000 available from SUN MICROSYSTEMS or computers mentioned above available from IBM. As discussed in further detail below, the database is hosted in a magnetic RAID drive (such as RAID-0, RAID-1, and RAID-5, with read/write disk space of 20 Tbytes), although read/write optical, semiconductor, ferromagnetic, and quantum memories may be used as well, provided the information contained therein is retrievable by the network computer 1.

Further, the database 2 is connected to the network computer 1 either by the link L1, which is a remote or local connection. In remote configurations the link L1 could take the form of a public switch telephone network line (PSTN), a high-speed digital line such as a T-1 or T-3 line, or any type of wireless link such as a cellular network, a very small aperture terminal (VSAT) link, a LEO or GEO satellite link, etc. Of course the database 2 can also be connected to the network computer 1 when L1 is a local link such as a local bus, a PCMCIA bus, universal serial bus (USB), EIA-232, ISDN (ISO 8877), VMEbus, and IEEE 1394 ("FireWire") as described in Wickelgren, I., "The Facts About "FireWire", IEEE Spectrum, April 1997, Vol. 34, Number 4, pp. 19–25, the contents of which are incorporated herein by reference.

The network computer 1 can also have similar connections to the revenue agency 4 and the input mechanism 3. The information communicated between the network computer 1 and the database 2, input mechanism 3 and revenue agency 4 may be sensitive information, and thus can be transmitted using any type of encryption system, including application level encryption such as pretty-good-privacy (PGP) or other encryption/hashing techniques, for example, or data symbol encryption such as with direct sequence or frequency hopping spread spectrum communications, where the communications symbols are spread with a pseudo random noise code. Similarly, error detection and correction coding such as an inner BCH code followed by an outer convolution code adds an additional degree of data protection while serving to preserve information integrity.

The present invention as shown in FIG. 1 can be implemented to efficiently and accurately recover revenue from interstate sales transactions for which a seller does not collect a sales tax. The control operation performed by the network computer 1 is shown in FIG. 7, and is executed by one or more processors in the network computer (which by the way may be a distributed processor having processing resources distributed about a network) reading computer readable instructions encoded in memory in the network computer 3. The operation executed by the network computer 1, in FIG. 1, implementing the control operation of FIG. 7, will now be discussed in greater detail.

In a first operation in the present invention, a database of untaxed sales data is generated in step S1. More specifically, the input mechanism 3 obtains data as to interstate sales transactions on which a tax was not collected by the seller. This data is then provided to the network computer 1, and the collected data is then stored in the database 2, so as to populate the database 2 with interstate sales data. Structuring, sorting, indexing, querying, and controlling the database 2 is performed to implement the functions described herein using techniques available to skilled database programmers, such techniques being described in various publications such as Korth, H. F., et. al., "Database System Concepts", McGraw-Hill, Inc., 1991, ISBN 0-07-044754-3, and Khoshafian, S., et al., "A Guide To Developing Client/Server SQL Applications", Morgan Kaufmann Publishers, Inc., 1996, ISBN 1-55860-147-3, the entire contents of each of which are incorporated herein by reference. The specific manner in which the input mechanism 3 can obtain such data is discussed in further detail below.

The operation then proceeds to step S2, which is an optional step—hence the dashed line, in which the data stored in the database 2 is compared with data hosted by the revenue agency 4. This step addresses a concern that a purchaser of goods may voluntarily pay a sales or use tax on an interstate purchase, or in some other way the purchaser will have been required to pay the sales or use tax. To ensure that such a purchaser is not double-billed, the network computer 1 can in step S2 compare the data in the database 2 with data hosted in a revenue agency database indicating paid taxes on interstate sales. When it is determined that the database 2 contains data for sales transactions on which a tax has already been paid, such sales transactions are deleted from the database 2. To facilitate this comparison process, the database 2 and the revenue agency database may be constructed as a relational database, where one or more records in the database 2 relate to one or more records in the revenue agency database. This step S2 is optional because a revenue agency 4 may not have such records of voluntarily paid taxes available or may not accept such voluntarily paid taxes. Alternatively, the network computer 1 holds the tax paid data on behalf of the revenue agency 4. In this way the revenue agency need not be bothered with maintaining records on who has paid their sales or use tax, and relies on the proprietor of the network computer 1 to maintain this information. In this alternative embodiment, residents remit their taxes directly to the proprietor of the network computer 1.

The operation then proceeds to step S3 in which the network computer 1 after reviewing the data in the database 2 then automatically generates and sends, for example by mail or secure (e.g., encrypted) electronic communication, tax due notices to purchasers of goods on which the appropriate sales or use tax has not been paid. This generating and sending of the tax due notices can, e.g., take place on letterhead of the revenue agency collecting the taxes; in this instance, the operator of the network of the present invention acts as an agent of the revenue agency. Depending on the arrangement with the revenue agency, such tax due notices require payment to be sent directly to the revenue agency 4 or require remittance to the operator of the network computer 1. When the tax due notice indicates payment is to be paid to the network operator, the network operator essentially acts as an independent contractor for the revenue agency 4 and can takes the revenue agency 4 out of the loop of collecting such taxes. Thus, implementing the procedure of FIG. 7 avoids the problem of shifting the tax collection burden on the seller, and also avoids having the government send tax due notices and collect and monitor the payment of tax remittances. Moreover, the system of FIG. 1 when implementing the process of FIG. 7 enables a separate entity to perform the tax collection process on interstates sales with minimal inconvenience on sellers, and state and local governments.

This generation and sending of a tax due notice in step S3 can be triggered by several events. In one case, a tax due notice can be sent for all untaxed sales transactions. However, this system may become cumbersome due to the need to generate and send a large number of tax due notices for relatively small tax amounts. Another alterative is to periodically send one tax due notice report to a purchaser indicating all taxable transactions during a specific time period for which taxes are due. For example, once every month or once every three months a purchaser may receive a tax due notice indicating all purchases for the one-month or three-month period for which taxes are due. Of course, a hybrid type system could also be implemented in which the tax due notices are periodically sent, and in which if a certain purchase is greater than a specific amount, i.e. if a certain purchase is for a large value, say 1,000.00 or more, a specific tax due notice will be issued for that one certain large value purchase.

The network computer 1 can also operate with several revenue agencies, even though only one is shown in FIG. 1. Under this instance, detailed information about sales tax rates and structures for each revenue agency can be part of the computer program product resident within the computer resources available to the network computer 1. The result is that the sales database 2, which will be sorted through computer-based sorting processes, can be organized by revenue agency, with purchase information broken down into database fields of taxable categories and a tax due on an item by item basis. Further, the tax due notices generated by the network computer 1 can include, as noted above, revenue agency letterhead, and can also include a revenue official signature (physical or digital equivalent), the purchaser's name and address, the purchase date, the purchase items broken down into broad categories, seller's name, the tax due, an explanation of the basis for the tax, etc.

After generating and sending the tax due notices in step S3, the operation then proceeds to a step S4 in which recordation is made when the taxes are paid. If the tax payments are to be paid directly to the revenue agency 4, then in this step S4 the network computer 1 accesses a revenue payment database in the revenue agency 4, which database in the revenue agency 4 will be updated when a tax payment is received. This database in the revenue agency 4 may, but need not, be implemented in a similar fashion to the database 2. In this way, the network computer 1 can then monitor the database in the revenue agency 4 to determine whether any taxes have been paid. Alternatively, if the tax payments are to be sent directly to the network operator, then when the tax payments for the tax due notice are received, the data in database 2 is updated to reflect the tax payments.

The operation then proceeds to a step S5, which is applicable to the case that the tax payments are to be sent to the network operator, and in this step S5 the appropriate payment is remitted to the revenue agency 4 along with a report of the taxes collected. Of course if the revenue agency 4 directly receives the tax payments, this step S5 is omitted.

Figure 2:
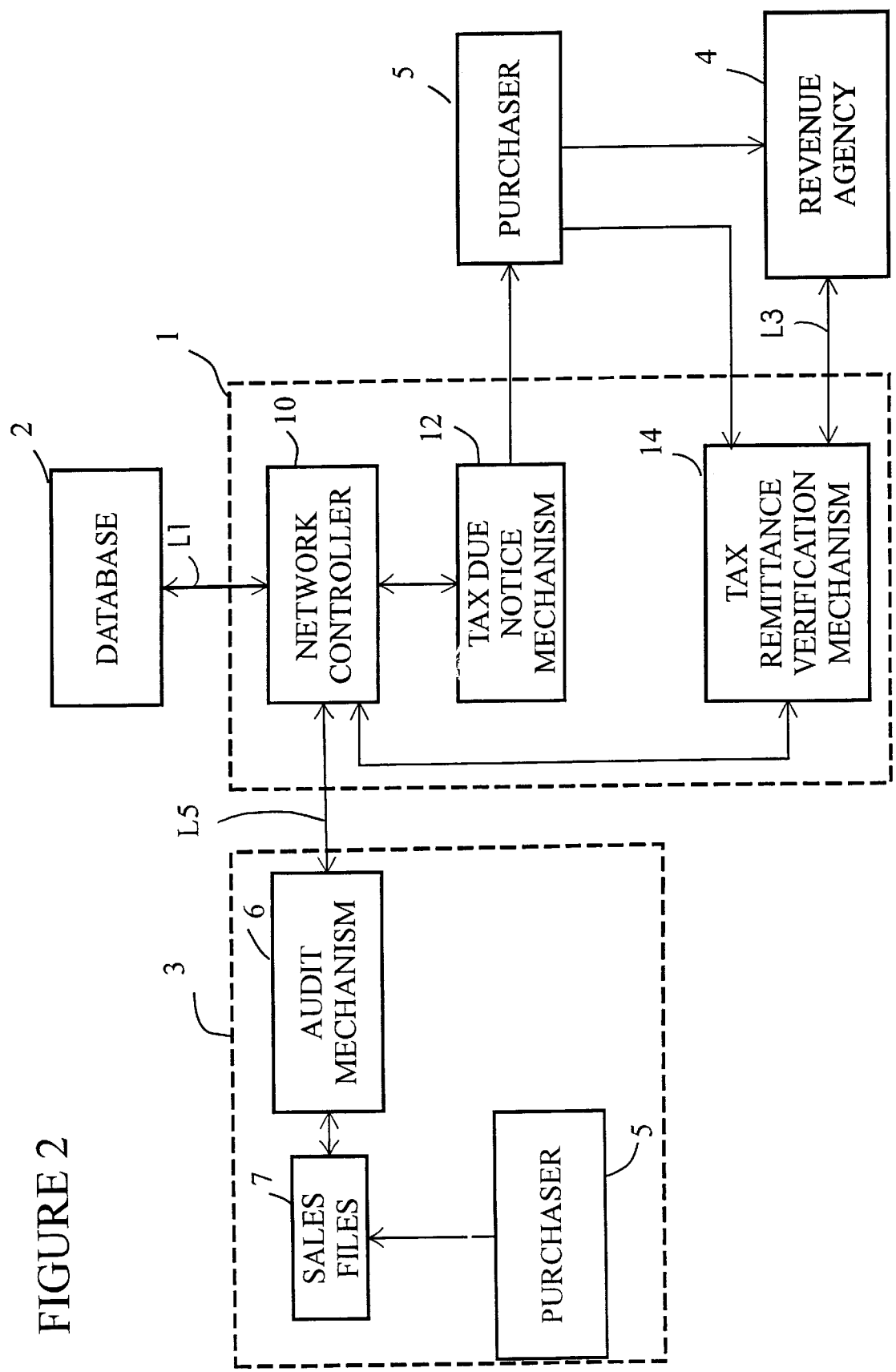
FIG. 2 is a block diagram of a more detailed system configuration in a more specific further embodiment of the present invention.
Figure 8:
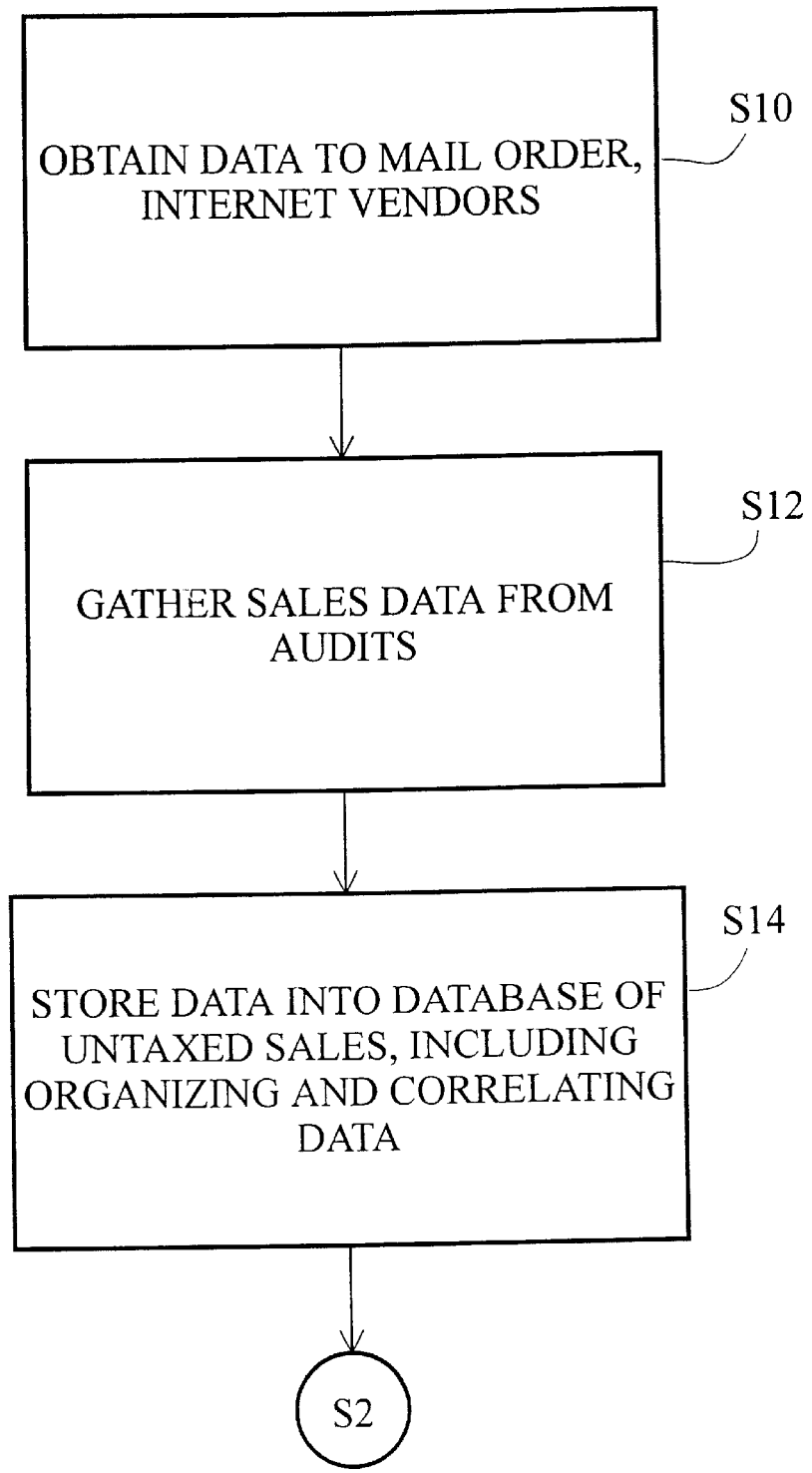
FIG. 8 shows one implementation of one process step of the overall system operation as shown in FIG. 7.

FIG. 2 shows a more detailed block diagram of the overall system of FIG. 1, and which implements one method of initially inputting data of untaxed sales transactions to the network computer 1. FIG. 8 also shows the control operations executed in this embodiment of FIG. 2.

As shown in greater detail in FIG. 2, the network computer 1 includes a network controller 10, a tax due notice mechanism 12, and a tax remittance verification mechanism 14, each of which may be implemented by a CPU in the network computer 1 executing instructions stored in memory, or the hardware/firmware equivalent. In the operation in the present invention, after data of an untaxed sales transaction is input into the database 2, the tax due notice mechanism 12 automatically prints and sends, e.g. mails, a tax due notice to a purchaser 5, as noted in step S3 above. Further, then the purchaser 5 can remit payment to either the revenue agency 4 or to the network operator itself, and then the database 2 can be updated as to tax due notices which have been paid, as noted in step S4.

In the embodiment shown in FIG. 2, the manner in which the input mechanism 3 receives data of the untaxed transactions to be provided to the database 2 is by an audit operation by audit mechanism 6. Also with reference to FIG. 8, a first step in executing an audit is to obtain data of mail-order, Internet, etc., vendors which engage in interstate commerce, see step S10. Then, sales data is gathered from auditing sales file 7 of such interstate sellers, reflecting sales to a purchaser 5 on which no sales tax has been collected by the seller, see step S12. This audit can be a manual audit or can be an automatic audit which electronically scans the sales files 7 of a seller. The sales files 7 can range from paper files which are manually read and input, e.g. through a keyboard, electronically scanned, etc., to commercial databases, e.g., ORACLE 7, ORACLE 8, etc. of the seller which can be searched by search engines, etc.

As noted above, certain states have entered into "Compacts" with other states to exchange such information discovered during state audits. The system shown in FIG. 2 can obtain data of untaxed interstate sales transactions based on such an auditing operation of sales files 7. The data obtained during this audit operation is then stored in the database 2 through network computer 1, and as this data is stored it is organized and correlated see step S14.

A second implementation of obtaining data of untaxed interstate sales transactions to populate the database 2 is to require sellers to make such information available or to require sellers to download such information to a central data warehouse which can then be accessed by the network computer 1. That is, the collection of data of untaxed sales transactions could be facilitated if a seller is required to record information of an interstate sale for which the seller did not collect a tax, and if the seller is then required to either make this information available to outside parties, or if the seller is required to download such information to a central data warehouse. After this data is then downloaded to a central data warehouse, such data can then be accessed by the input mechanism 3 of FIG. 1, and such data can then be routed to the database 2 through the network computer 1. In this instance, the input mechanism 3 would be a connection to download data from the central data warehouse or from the seller's sales files directly, i.e., without requiring an audit of such materials.

Figure 3:
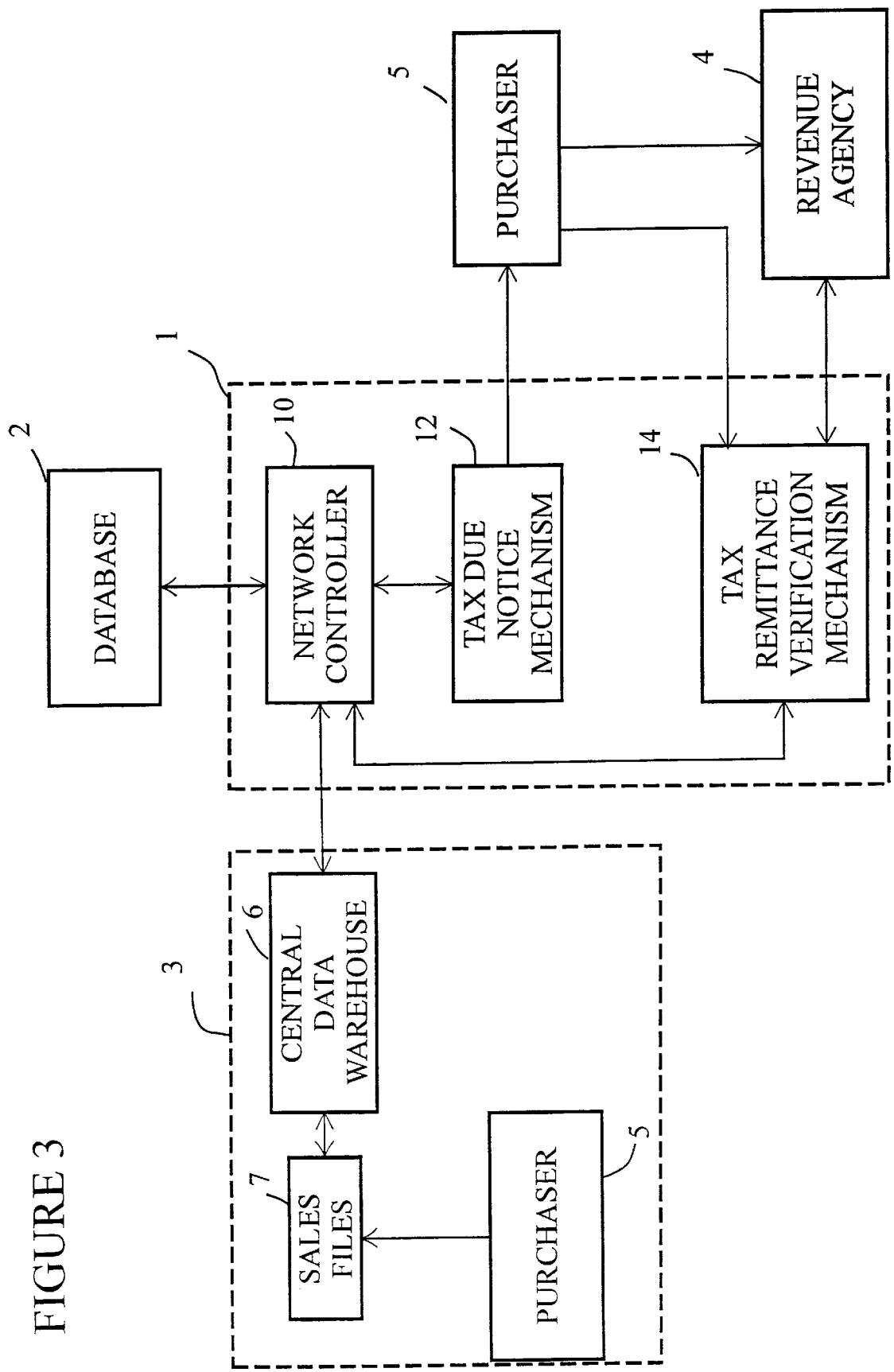
FIG. 3 is a block diagram of a more detailed system configuration in a more specific embodiment of the present invention.

Such a further system of obtaining data of untaxed sales transactions as in the present invention is shown in FIG. 3, and a control operation to implement this system is described with reference to FIG. 9.

As shown in FIG. 3, the input mechanism 3 includes a connection to a central data warehouse 8 that receives information from sales files 7 of sellers engaged in interstate sales. The network controller 10 can be structured to download data from the central data warehouse 8. As an alternative, if a seller is required to make sales files 7 available to outside parties, then the central data warehouse 8 can be omitted and the network controller 10 can directly access a sellers sales files 7 which include data in a specific format that does not require an auditing procedure. It is also noted that in this operation the database 2 may become redundant because the network controller 10 could utilize the central data warehouse 8 as the only large central database. However, if a network operator wishes to further manipulate, organize, correlate, etc., the data from the central data warehouse 8, the database 2 would still be utilized. Thus, the database 2 may be viewed as a local database.

Figure 9:
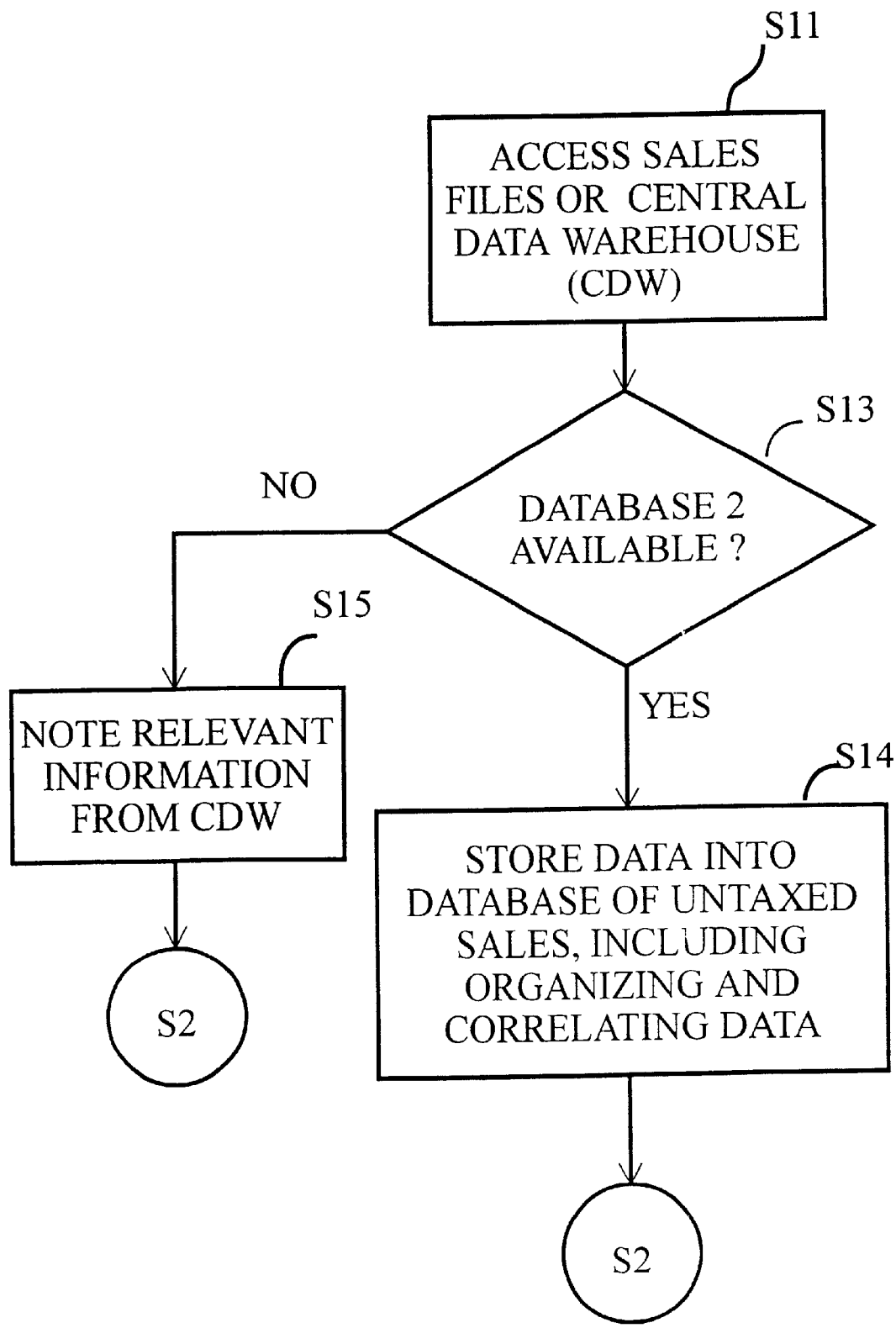
FIG. 9 shows one implementation of one process step of the overall system operation as shown in FIG. 7.

The control operation implemented in this system of the present invention is shown in FIG. 9. As shown in FIG. 9, in a first step S11 either the sales files 7 or central data warehouse 8 is accessed to recover records of untaxed interstate sales transactions. Then, the operation proceeds to step S13 in which it is determined whether the database 2 is available. As noted above, by utilizing a central data warehouse 8 the database 2 need not be required. If no database 2 is available, i.e. NO in step S13, the operation then proceeds to step S15 in which the relevant information from the central data warehouse 8 is accessed. The operation then proceeds to step S2 in FIG. 7 and the ensuing steps. If database 2 is available and is to be accessed, i.e. YES in step S13, then the operation proceeds to step S14, which is the same step as in FIG. 8, in which the data from either the sales files 7 or central data warehouse 8 is organized, correlated and then stored in the database 2. The operation then also proceeds to step S2 in FIG. 7.

As noted above, the database 2 stores data of untaxed interstate sales transactions. A structure of the data fields stored in the database 2 therefore should include a purchaser's name (which may include a unique taxpayer ID and/or the taxpayer's social security number), an address to which a bill was sent (ADDRESS 1), an address to which goods or services were delivered (ADDRESS 2), sale date, sale amount, sale information broken down into broad categories such as clothing, food, merchandise, etc., because each state has different sales and use tax laws depending on the type of purchase transaction and any information as to any claim of tax exemption claimed by the purchaser, and Revenue Agency Code that uniquely identifies the revenue agency to which the tax is to be remitted. FIG. 4 shows the structure of one example of data fields in this database 2. Optionally, a flag field may be added that indicates whether, and how many times, the network computer 1 has checked to determine whether the tax has been remitted by the taxpayer. This flag field includes a separate indication that the tax has been paid, once the network computer 1 verifies the tax has in fact been paid. The flag field may also include an indication as to when the tax was paid so that the network computer 1 will know when to purge (or move to permanent storage, such as an optical media) past payment records.

Figure 5:
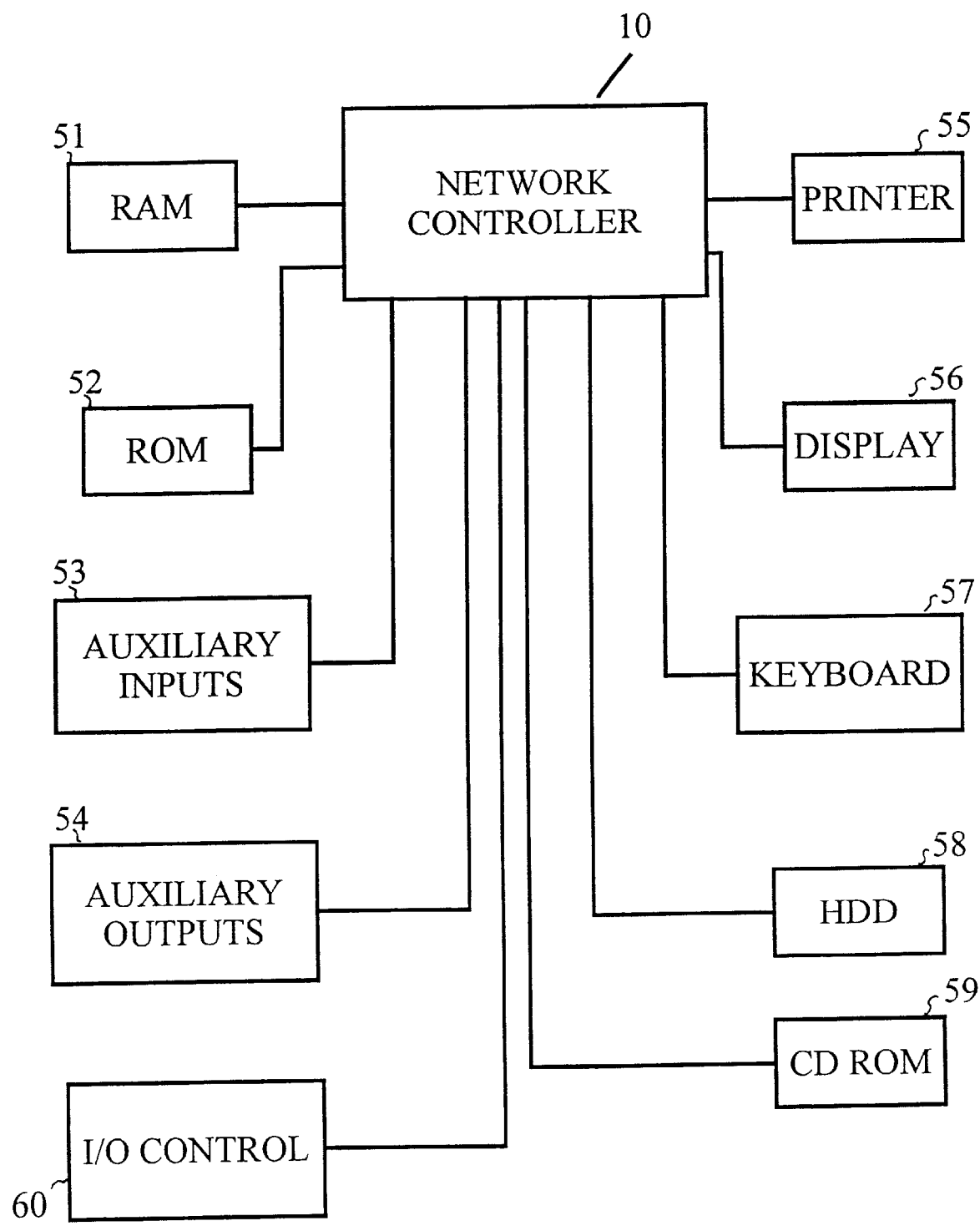
FIG. 5 is a block diagram of system components of a network computer in one embodiment of the present invention.

FIG. 5 shows a specific configuration that the network computer 1 can take. The network computer 1 includes a network controller 10 connected to a RAM 51 and a ROM 52. The network computer 1 also includes a printer 55 to print out tax due notices to be mailed. Alternatively, the tax due notices can be sent by encrypted e-mail through I/O controller 60. Such e-mail messages may optionally include a digital signature, such as that used with DES. The network computer 1 also includes a display 56 and a keyboard 57 (or other user interface combination such as a touch screen display, or voice recognition software), which can include a mouse (not shown), a hard disk drive 58, a CD-ROM 59, auxiliary inputs 53, and auxiliary outputs 54. The network computer 1 can also include a series of such systems connected in a local or wide area network and can of course take on other configurations, such as a distributed processing architecture.

As previously discussed, the network computer 1 can be one or more SUN MICROSYSTEM SPARKSTATIONs that include a semiconductor RAM 51 that receives an application program from ROM 52 which holds an application program for gathering sales data, correlating and organizing the sales data and cross-checking for the payment of the taxes. Other computers, such as those previously discussed, may be used as well, including a network of OMNIPLEX GL5133 computers manufactured by Dell Corporation and connected by way of a local area network or a wide area network. Distributing the processing resources of the network computer 1 may assist in future revenue collection efforts. The network computer 1 (referred to in this example in the singular) includes the display 56 (which may be a plurality of displays if multiple operators implement simultaneous control and query processes) so that an operator can view information input and retrieved from the network controller 10. As noted above, the printer 55 can print the tax due notices, and subsequent notices, as well as reports summarizing tax receipt activity and revenue agency reports. The auxiliary outputs 54 can be used for future expansion capabilities. Further, the memory elements can be configured in a RAID configuration. A RAID configuration allows for local retrieval of state tax statutes, and other database information that may be provided from other commercial databases, such as state revenue agency databases. The auxiliary inputs 53 are also used for expansion capability and the keyboard 15, which as noted above can include a mouse, facilitates user interface. The I/O control 60 further controls all communication between the network computer 1 and the database 2, input mechanism 3 and revenue agency 4.

As shown in FIG. 7, the overall control operation of the present invention can include the step S2 to compare data in the database 2 to data in a revenue agency 4 database to determine whether any taxes have been paid on the transactions stored in database 2. Of course, if the database 2 is not included, which as noted above is a possible configuration in the system as shown in FIG. 3, this compare step S2 will compare data from the central data warehouse 8 to the data in the revenue agency 4 database. The specifics of this operation in step S2 are shown in further detail in FIG. 10.

Figure 10:
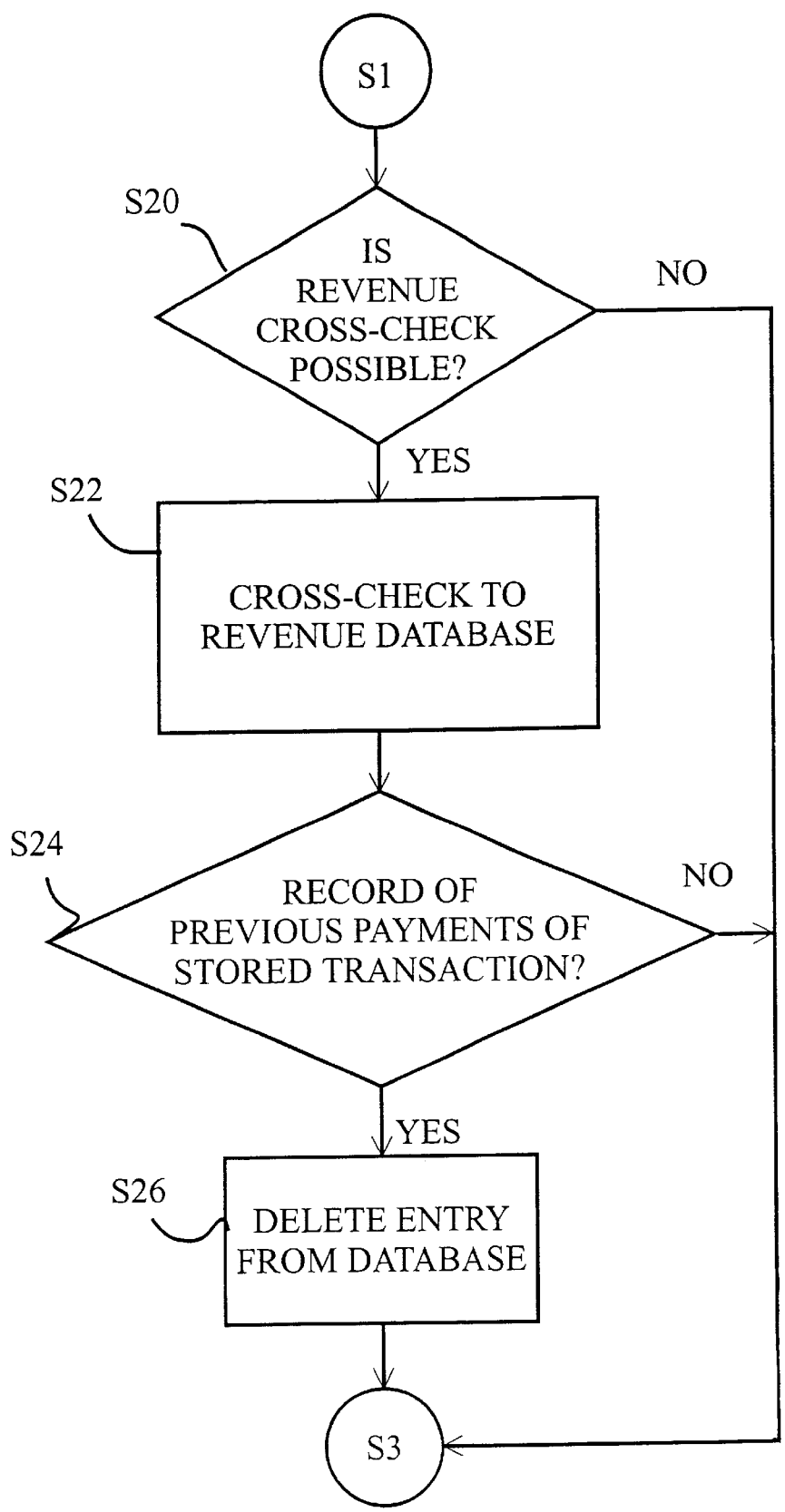
FIG. 10 shows one implementation of one process step of the overall system operation as shown in FIG. 7.

As shown in FIG. 10, in a first step S20 it is determined whether a revenue cross-check is possible. If a revenue cross-check is not possible, i.e. NO in step S20, the operation immediately proceeds to step S3. If a revenue cross-check is possible, i.e. YES in step S20, the operation proceeds to step S22 in which the data in either the database 2 or the central data warehouse 8 is cross-checked with data in the database of the revenue agency 4. The operation then proceeds to step S24 in which it is determined whether any record of a previous payment of the stored transaction is stored in the revenue agency 4 database. This check may be recorded in the flag field of the record stored in the database 2. If NO in step S24, indicating that no tax has been paid on the stored transaction, the operation again proceeds to step S3. If YES in step S24, indicating that a purchaser has paid a tax on a stored transaction in the database 2 or central data warehouse 8, the operation then proceeds to step S26 where the entry is deleted from the database 2 or is ignored in the central data warehouse 8. The operation then again proceeds to step S3. As an alternative to step S26, the entry is held for a predetermined period of time (e.g., one month) and then purged or stored on permanently storage media.

Figure 11:
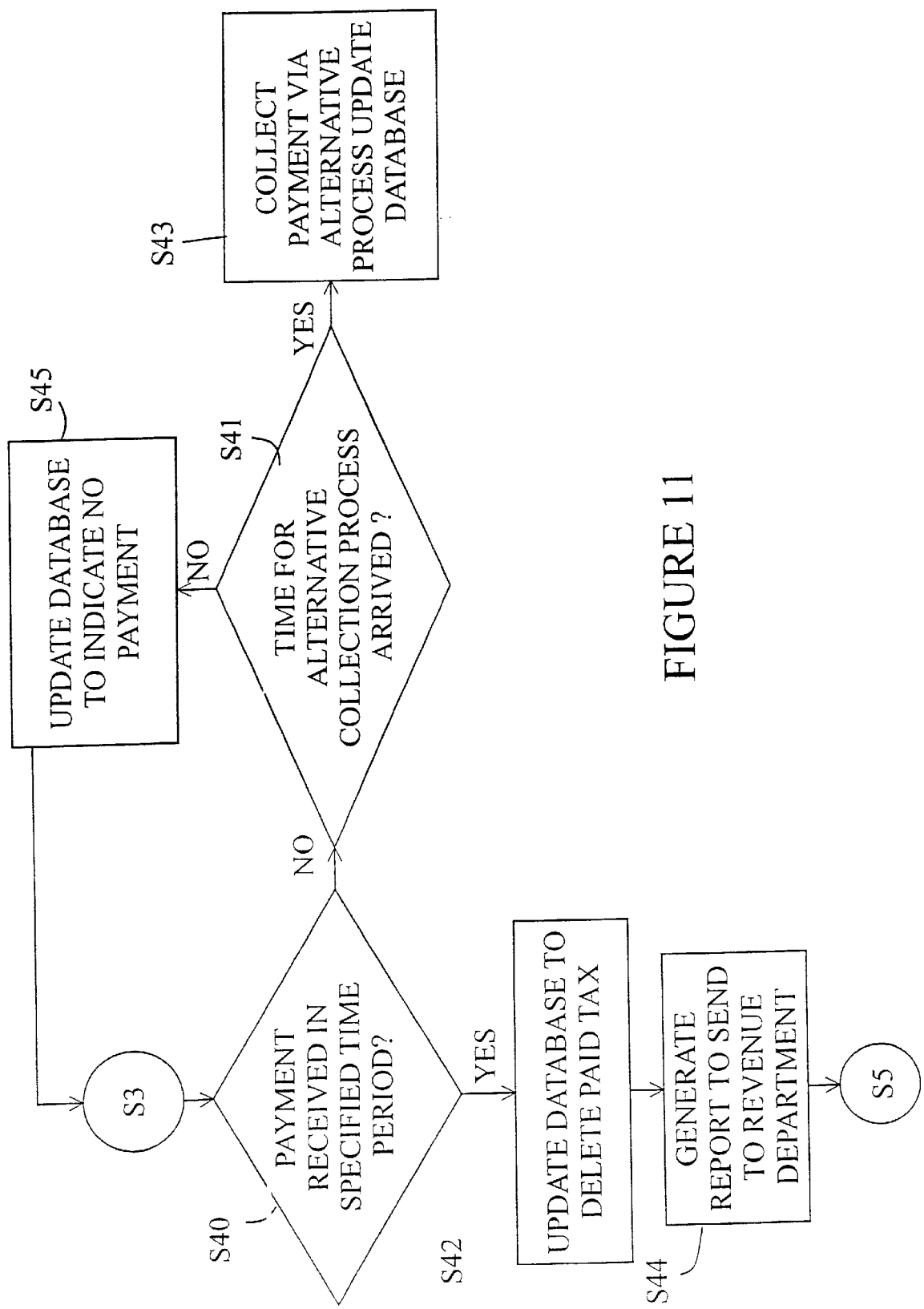
FIG. 11 shows one implementation of one process step of the overall system operation as shown in FIG. 7.

As also noted in the overall control operation of FIG. 7, the present invention can also verify whether a tax remittance has been executed. This operation is shown in FIG. 11, and is implemented by the tax remittance verification mechanism 14 in FIGS. 2 and 3. As noted above, this operation can be executed at the revenue agency 4, or can be implemented in the network computer 1 as a part of the network of FIG. 1.

As shown in FIG. 11, after the tax due notices are generated and sent in step S3, it is then determined in step S40 whether a payment has been received in a specified time period, for example 30 days. If the payment has been received within the specified time period, i.e. YES in step S40, the operation then proceeds to step S42 in which the database 2 is updated to indicate that a tax has been paid. The operation then proceeds to step S44 in which a report is generated and sent to the revenue department indicating that the tax has been paid. The operation then proceeds to step S5 in which the payment is remitted to the revenue agency 4.

If the payment is not received within the specified time period, i.e. NO in step S40, the operation then proceeds to step S41. In step S41 it is determined whether a time for an alternative collection process has arrived. For example, a purchaser may be given 90 days to voluntarily remit the due tax. If this time period has not expired, i.e. NO in step S41, the operation then proceeds to step S45, in which the database 2 is updated to indicate that no payment has been received. The operation can then proceed again to step S3 where a new tax due notice is generated and sent, and this new tax due notice can then indicate that payment is late. In the example noted above, a purchaser may be given 90 days to fully pay a due tax. When this time period expires, i.e. YES in step S41, the operation then proceeds to step S43 where the payment can be collected via alternative methods. The alternative methods can involve state action such as garnishment of wages, obtaining judgments, etc. The form that the alternative collection methods can take will be controlled by the procedures of the revenue agency 4. If the amount of remitted tax does not reconcile with the amount recorded in the database 2, an automated audit mechanism is initiated that will determine a remaining amount of tax due and trigger the issuance of another tax due notice (or provide a refund if the tax is overpaid). Alternative, if the remittance does not reconcile with recorded tax owed, the network computer places the taxpayer's ID on a list for manual inspection and auditing so as to resolve the payment discrepancy.

Upon receipt of payments, which will be made via lockboxes in each state (or secure electronic exchange), the inventive computer-based system then generates a transmission report on all collections received since the last remittance payment to a state. The transmission report authorizes the treasury function to wire a payment of all receipts, less network fees, to the appropriate revenue agency. The treasury function within the Network wires funds to the revenue departments which concludes all network activities on all billing statements included in the remittance.

It should also be noted that in either the auditing operation or the operation of accessing the sellers file 7 or central data warehouse 8, information can be gathered that certain purchases were returned, and that therefore no tax is due on such returned purchases. In this instance, when records of returned purchase are received, the database 2 can be updated to delete the recording of corresponding sales transaction so that a purchaser is not improperly billed for a returned purchase.

As noted above, a further drawback in currently existing tax collection systems is that even if a seller wishes to collect appropriate sales taxes, it is a cumbersome procedure as a result of the numerous tax rates of various jurisdictions and the different rules as to what items are taxable in the different jurisdictions. Even further, once a seller does collect a tax a seller must then route the tax to the appropriate jurisdiction. As noted above, there are thousands of different taxing jurisdictions just within the United States. Obviously it would be cumbersome on the seller to collect the appropriate tax and then route the appropriate tax to the appropriate revenue agency.

One further system which simplifies the entire operation of collecting taxes on currently untaxed interstate sales is to require a seller to only collect a fixed simplified tax for every interstate sale. Levying such a tax would undoubtedly require Congressional action. For example, a seller may be required to collect a 3% tax for all interstate sales which are otherwise not taxed. This tax collection process would be simplified to the point of not being a burden on the seller, i.e. the seller would then not be required to keep track of tax procedures for the thousands of taxing jurisdictions in existence. Then, the seller downloads the information of the sales to a database, along with the payments collected. The database then organizes the data received, and based on such data, routes the collected funds to the appropriate revenue agency. Such an operation would simplify tax collection and would ensure that the appropriate revenue agency at least received a certain revenue based on the simplified tax rate from a sale which is currently completely untaxed.

Figure 6:
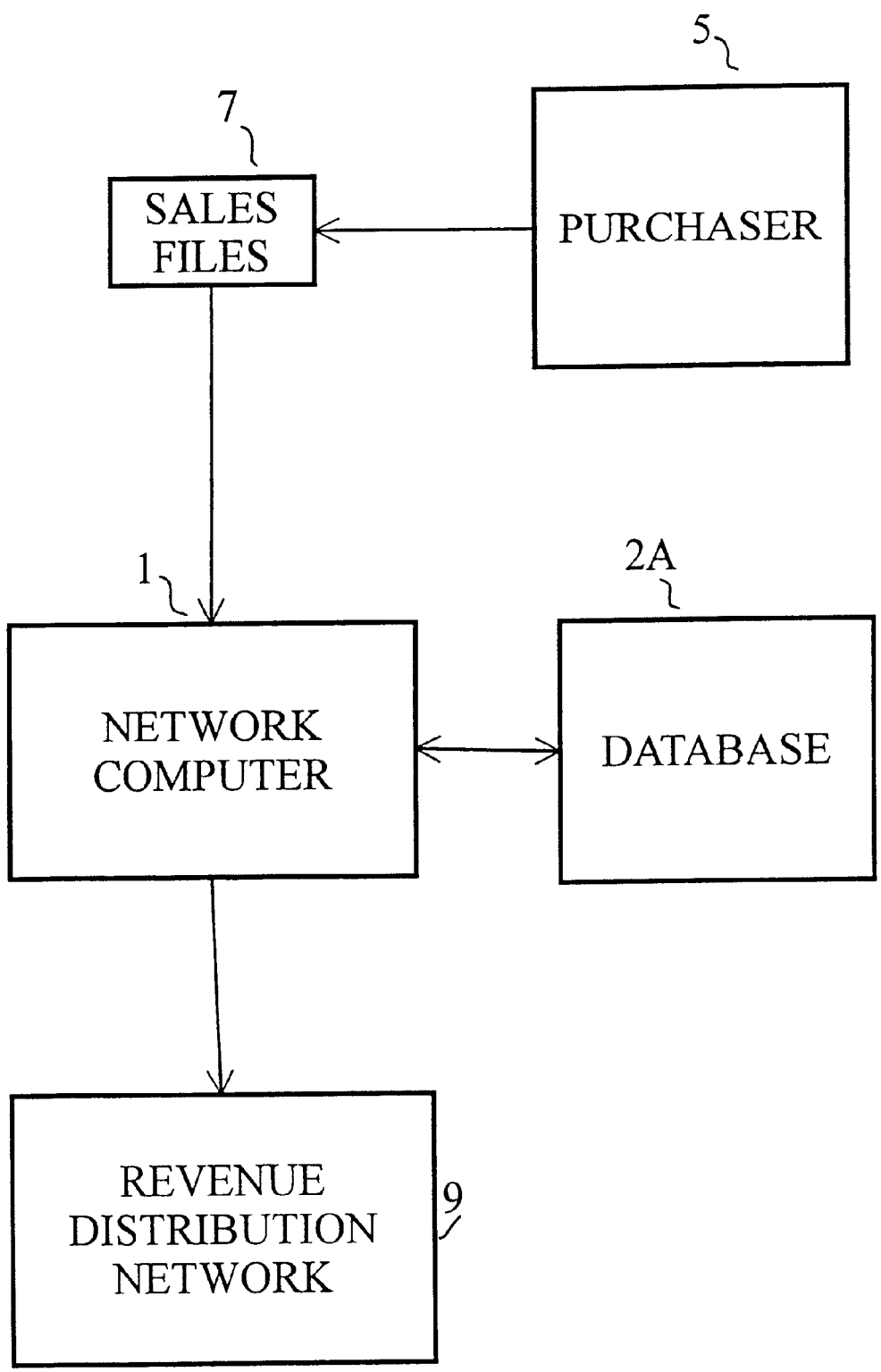
FIG. 6 is a block diagram of a system configuration of a further embodiment of the present invention.
Figure 12:
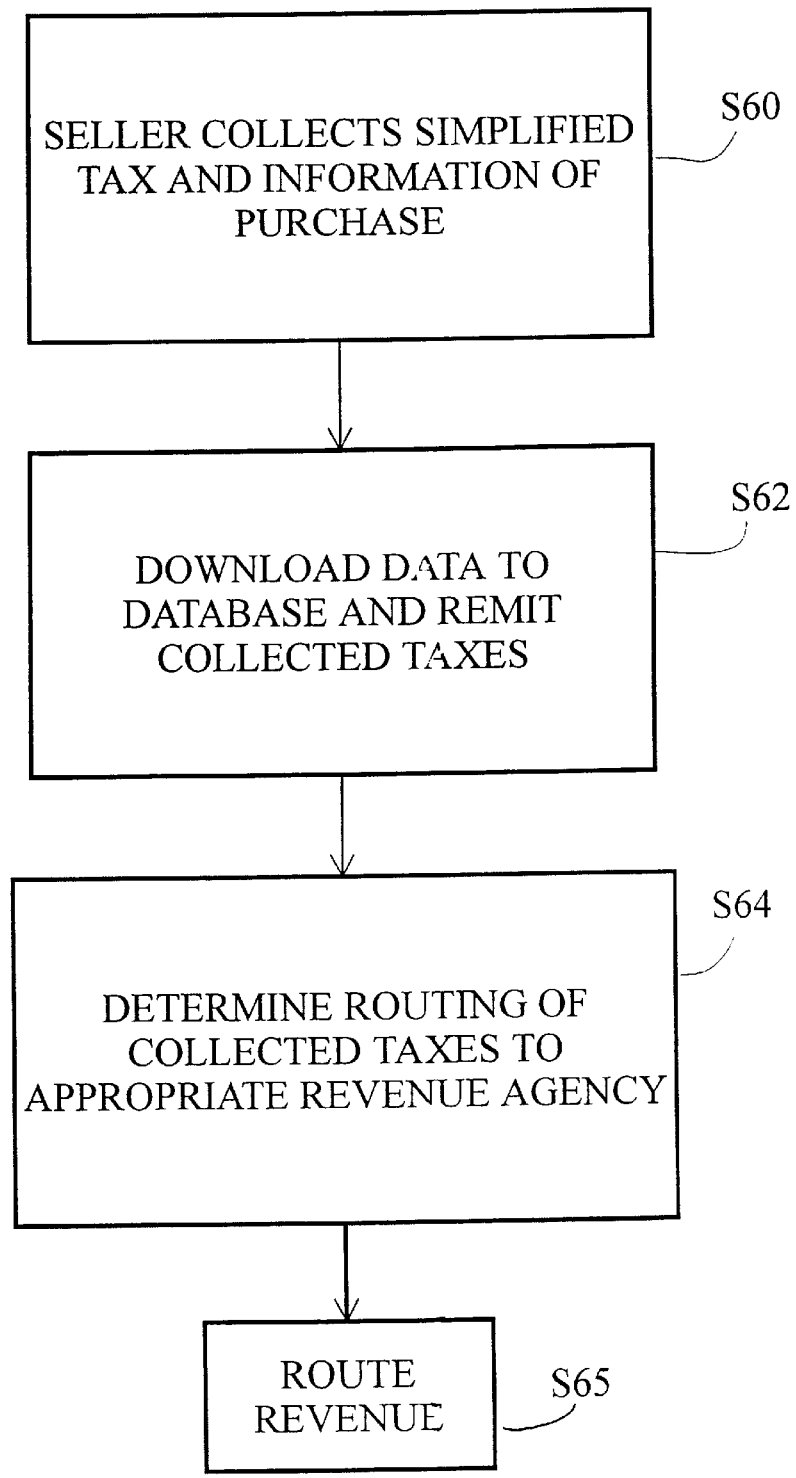
FIG. 12 is a flow diagram of an overall process control system operation in the further embodiment of the present invention of FIG. 6.

Such a further system of the present invention is shown in FIG. 6, and a corresponding control operation is shown in FIG. 12. As shown in FIGS. 6 and 12, the seller still maintains sales records 7 of purchases from a purchaser 5. The seller, however, also collects a simplified tax and information of the purchaser 5, see step S60. The seller then transmits such sales files 7 to a database 2A of the network computer 1, see step S62. However, the seller also transmits the collected revenues from such sales transactions through the network computer 1. The network computer 1 then stores such data in the database 2A and stores the collected revenue in an appropriate account. This database 2A can store at least the same data as noted in FIG. 4 of the sales transactions. However, this database 2A can also store a record of the amount of tax received from the sales transaction. The network computer 1 then determines for each reported sales transaction the appropriate revenue agency to receive the collected simplified tax. This determination can be made based on the percentage of collected revenue per respective purchaser taxing jurisdiction. The network computer 1 then transmits through a revenue distribution network 9 the appropriate revenue sources to the appropriate revenue agency based on the reported sales, see step S65.

As a concrete example, if 10% of sales by a seller are to residents of New York City, the database 2A will store records of such sales and thereby 10% of the revenue collected by the seller would then be distributed to the revenue collecting agency of New York City by the revenue distribution network 9.

In this way, this operation of the present invention can provide revenue on currently untaxed sales transactions to an appropriate revenue agency, although at a simplified tax rate. However, by providing such revenue at a simplified tax rate, a burden of collecting such taxes on the seller is minimized.

It is envisioned that a substantial culture change will have to take place as purchasers become accustomed to paying their tax obligations on Internet and mail order purchases. An employee of the operator of the network computer 1 inventor will have data readily available on any purchaser who has received a bill. If a purchaser makes an incoming call to the network, the representative will access the tax due bill and all associated data on the purchase. The network employee can work as an agent for the revenue department under whose name the bill was mailed. As such, customer service telephone numbers will appear on each and every statement. Each number is specific to a particular state and only representatives with expertise in the sales tax requirements for a particular state will respond to the incoming calls.

In such a call, it is expected that the purchaser will dispute the tax due for two primary reasons: similar purchases were never previously taxed or because sales data obtained via the original audit was erroneous. On the matter of the first issue, each representative is educated in the sales tax structure of the particular state. The representative will review the provisions within the state tax code that outlines the state's right to tax the purchase which was made. As a registered agent for the revenue department for the state, the representative will review the rights and remedies the revenue department has for collecting taxes which are due, and specifically the rights and remedies the revenue department has for collecting sales and use taxes.

On the second matter, in which the purchaser contests the bill due to erroneous audit information, the account is suspended while an investigation ensues. To the extent possible, re-verification of the purchase is made with the prominent seller.

A percentage of bills will not be paid without follow up and collection efforts. Calls are made by a collection group working for the Network. Collection efforts will differ by each state and are governed by the applicable rights of the respective revenue department for other similar tax collections. The method and remedies of collection is programmed into the network computer 1. These remedies are evident to the network employee as collection efforts commence. The recovery of unpaid, outstanding tax bills will follow prescribed patterns as laid out by the revenue agency for that state.

Tax payments are made to commercial lock box systems in each state which is swept daily by a commercial service specializing in such activities. Alternatively electronic payments are made by way of the "dial-in" access, or secure electronic transactions, for example. Each tax due notice mailed to a purchaser will include a pre-addressed envelope. The envelope is addressed to the respective revenue department at a post office box within the city in which the revenue department is based. The post office box is managed by a commercial service specializing in lock box management, funds management and wire transfers.

The commercial service will wire the funds to the treasury department within the network for accounting and registration against the receivable for each purchaser. At that time, an electronic notation is made in the accounts receivable section of the database 2 to reflect the date and amount of the receipt on transaction by transaction basis.

The operation and structure of the present invention as discussed above have focused on interstate sales which are currently not being taxed. However, the infrastructure of the present invention as discussed above is useful in other applications in analogous situations in which revenue must be efficiently and appropriately distributed among different taxing entities.

As some other concrete examples of the present invention, which examples are by no way an exhaustive list of applications, if a national sales tax was implemented, the infrastructure employed by the system of the present invention could ease in the distribution of collected revenues to an appropriate revenue agency.

As another concrete example, the current system of collecting gas and highway taxes is extremely complicated in that the collection of such taxes attempts to correlate the distribution of the taxes paid based on actual resource usage. The present invention could ensure the efficient and accurate redistribution of gas and highway taxes to appropriate revenue agencies.

Further, issues of distributing a tax collected at only one point to different entities will arise in the formation of the European Union. In the formation of the European Union, a tax may only be collected at a final point of sale, but such a tax may be required to be distributed among different revenue agencies, which can encompass different countries. In this instance, the system of the present invention could be particularly effective in ensuring the efficient and appropriate routing of such collected tax revenues.

The mechanisms and processes set forth in the present description may be implemented using a conventional and general purpose microprocessor programmed according to the teachings of the present invention, as appreciated by those skilled in the relevant art(s). Appropriate software coding can readily be prepared by skilled programmers based on the teachings of the present disclosure, as will also be apparent by those skilled in the relevant art(s).

The present invention thus includes a computer-based product which may be hosted on a storage medium and include instructions which can be used to program a computer to perform a process in accordance with the present invention. This storage medium can include, but is not limited to, any type of disk including floppy disk, optical disk, CD-ROMS, magneto-optical disks, ROMS, RAMS, EPROMS, EEPROMS, flash memory, magnetic or optical cards, or any type of media suitable for storing electronic instructions.

Obviously, numerous additional modifications and variations of the present invention are possible in light of the above teachings. It is therefore to be understood that within the scope of the appended claims the present invention may be practiced otherwise than as specifically described herein.

What is claimed is:

1. A computer-implemented method of recovering tax revenue for multiple jurisdictions in which a remote seller has no nexus, comprising the steps of:
   populating a database hosted on a computer-readable medium with data of sales transactions, made by purchasers from the multiple jurisdictions in which the remote seller has no nexus, for which a designated tax has been paid;
   receiving revenue of the paid designated tax, exclusive of a payment for a purchase, corresponding to the data of the sales transactions in the database;
   determining a proportion of the received revenue to be allotted to respective revenue agencies based on the data of the sales transactions in the database; and
   routing the determined proportions of the received revenue to the respective revenue agencies.

2. A method of recovering tax revenue according to claim 1, wherein the step of populating the database includes the substep of accessing a central data warehouse which stores data of sales transactions on which a designated tax has been paid.

3. A method of recovering tax revenue according to claim 1, wherein the designated tax is a single rate sales tax.

4. A method of recovering tax revenue according to claim 1, wherein the network computer accesses a central data warehouse that stores data of sales transactions on which a designated tax has been paid so as to populate the database.

5. A method of recovering tax revenue according to claim 1, wherein the designated tax is a single rate sales tax.

6. A system of recovering tax revenue for multiple jurisdictions in which a remote seller has no nexus, comprising:
   a computer-readable database populated with data of sales transactions, made by purchasers from the multiple jurisdictions in which the remote seller has no nexus, for which a designated tax has not been paid; and a network computer configured to,
receive revenue from a payment corresponding to the designated tax for the data of the sales transactions in the database, but exclusive of a payment for a purchase,
determine a proportion of the received revenue to be allotted to respective revenue agencies based on the data of the sales transactions in the database, and
route the determined proportions of the received revenue to the respective revenue agencies.

7. A computer-implemented, method for recovering tax revenue from multiple tax jurisdictions, comprising steps of:
receiving from a seller a seller-collected sales tax, exclusive of a payment for a purchased item or service, originally paid by a purchaser and information regarding a tax jurisdiction of the purchaser and the purchased item or service;
storing said information in a purchase database;
correlating, after said receiving step, said information with a revenue agency code for a revenue agency associated with the tax jurisdiction of the purchaser; and
transferring said seller-collected sales tax to the revenue agency.

8. The method according to claim 7, wherein said correlating step includes a step of determining the tax jurisdiction of the purchaser from at least one of a residential address and a shipping address provided by said purchaser.

9. The method according to claim 7, further comprising a step of:
storing said seller-collected sales tax in an account prior to performing said transferring step.

10. The method according to claim 9, wherein said step of transferring further comprises steps of:
generating a transmission report of all payments for said one jurisdiction received over a predetermined time; and
authorizing, using said transmission report, said account to transfer said seller-collected sales tax to said revenue agency.

11. The method according to claim 7, further comprising:
receiving return information that a certain purchase has been returned;
updating said purchase database to reflect said return information.

12. The method according to claim 7, wherein said step of transferring said seller-collected sales tax comprises:
deducting a network fee from said seller-collected sales tax; and
wiring said seller-collected sales tax less said network fee to said revenue agency.

13. The method according to claim 7, further comprising:
reporting to said revenue agency that said seller-collected sales tax has been received.

14. A computer-implemented, method for recovering tax revenue from multiple tax jurisdictions, comprising steps of:
receiving a predetermined sales tax payment, but not a purchase amount, for a sale to a purchaser, wherein said purchaser being located in a purchaser jurisdiction outside a nexus of a vendor of said sale, said purchaser jurisdiction being one of multiple tax collecting jurisdictions;
updating a payment database to reflect said predetermined sales tax payment for said sale;
remitting said predetermined sales tax payment to a revenue agency in said purchaser jurisdiction;
reporting said predetermined sales tax payment to said revenue agency.

15. The method according to claim 14, further comprising a step of calculating the predetermined sales tax payment for a tax rate used by said purchaser jurisdiction.

16. A computer-implemented, method for recovering tax revenue from multiple tax jurisdictions, comprising steps of:
receiving a predetermined sales tax payment for a sale to a purchaser, exclusive of an amount of the sale wherein a vendor being located in a jurisdiction outside a nexus of the purchaser of said sale, said purchaser jurisdiction being one of multiple tax collecting jurisdictions;
sending from the vendor the predetermined sales tax payment;
determining if the tax payment has been received;
updating a tax payment database to reflect a receipt of said tax payment;
reporting said receipt of said tax payment to a revenue agency of one jurisdiction of multiple jurisdictions; and
remitting said tax payment to said revenue agency.

17. The method according to claim 16, wherein said remitting said tax payment step comprises a step of:
generating a transmission report of all payments for said one jurisdiction received over a predetermined time.

18. The method according to claim 16, further comprising steps of:
receiving return information that a purchase has been returned; and
updating said tax payment database to reflect said return information.

19. The method according to claim 16, wherein said step of remitting said tax payment to said revenue agency comprises steps of:
deducting a network fee from said tax payment; and
sending a payment that amounts to said tax payments less said network fee to said revenue agency.

20. A system for recovering tax revenue from multiple tax jurisdictions, comprising:
a memory configured to hold a sales file database configured to receive tax information about a purchase made by a consumer;
a tax revenue account configured to receive a sales tax collected by a seller from a consumer, exclusive of a payment for the purchase said sales tax being determined for a tax jurisdiction of said consumer, said tax jurisdiction being one of a plurality of tax jurisdictions;
a network computer configured
to transmit said tax information to said sales file database and said sales tax, to said tax revenue account,
to determine a revenue code for a revenue agency associated with said tax jurisdiction of said consumer, and
to remit said sales tax to said revenue agency.

21. The system according to claim 20, further comprising:
a revenue distribution network configured to transmit said remitted sales tax to said revenue agency.

22. The system according to claim 20, wherein said network computer further comprises:
a series of network computers.

23. A system for recovering tax revenue from multiple tax jurisdictions, comprising:

means for receiving from a seller a seller-collected sales tax, exclusive of a payment for a purchased item or service, and information regarding a tax jurisdiction of a purchaser and a purchased item or service;

means for storing said information in a purchase database;

means for correlating said information, received by said means for receiving, with a revenue agency code for a revenue agency associated with the tax jurisdiction of the purchaser; and means for transferring said seller-collected sales tax to the revenue agency.

24. A system for recovering tax revenue from multiple tax jurisdictions, comprising:

means for receiving a predetermined sales tax payment for a sale, exclusive of a purchase amount from a purchaser located in a purchaser jurisdiction, outside a nexus of a vendor of said sale, said purchaser jurisdiction being one of multiple tax collecting jurisdictions;

means for sending the predetermined sales tax payment from the vendor, to a payment database;

means for updating the payment database to reflect said predetermined sales tax payment for said sale;

means for remitting said predetermined sales tax payment to a revenue agency in said purchaser jurisdiction;

means for reporting said predetermined sales tax payment to said revenue agency.

25. A system for recovering tax revenue from multiple tax jurisdictions, comprising:

means for receiving a tax payment for a sale, exclusive of a payment for a purchase;

means for transmitting from a vendor the tax payment, to a tax payment account;

means for determining if the tax payment has been received;

means for updating a tax payment database to reflect a receipt of said tax payment;

means for reporting said receipt of said tax payment to a revenue agency of one jurisdiction of multiple jurisdictions; and means for remitting said tax payment to said revenue agency.

* * * * *